United States Patent
Gretz

(10) Patent No.: US 9,496,694 B1
(45) Date of Patent: Nov. 15, 2016

(54) EASY INSERTION ELECTRICAL CONNECTOR

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

(*) Notice: Subject to any disclaimer, the term of this patent is extended or adjusted under 35 U.S.C. 154(b) by 0 days.

(21) Appl. No.: 15/176,780

(22) Filed: Jun. 8, 2016

Related U.S. Application Data

(63) Continuation-in-part of application No. 14/996,932, filed on Jan. 15, 2016.

(60) Provisional application No. 62/174,591, filed on Jun. 12, 2015.

(51) Int. Cl.
*H02G 3/08* (2006.01)

(52) U.S. Cl.
CPC .................................. *H02G 3/085* (2013.01)

(58) Field of Classification Search
USPC ........................................................ 174/665
See application file for complete search history.

(56) References Cited

U.S. PATENT DOCUMENTS

| | | |
|---|---|---|
| D251,781 S | 5/1979 | Hutton |
| 4,299,363 A | 11/1981 | Datschefski |
| 4,711,974 A | 12/1987 | Borsh |
| 4,864,080 A | 9/1989 | Fochler et al. |
| 4,919,370 A | 4/1990 | Martin et al. |
| 5,374,017 A | 12/1994 | Martin et al. |
| 5,442,141 A | 8/1995 | Gretz |
| 5,693,910 A | 12/1997 | Gretz |
| 5,770,817 A * | 6/1998 | Lo ................ H02G 3/086 174/53 |
| 6,143,982 A | 11/2000 | Gretz |
| 8,253,043 B1 * | 8/2012 | Kiely ............. H02G 3/0616 174/650 |

* cited by examiner

*Primary Examiner* — Dhirubhai R Patel
(74) *Attorney, Agent, or Firm* — Jackson Patent Group, LLC

(57) ABSTRACT

An electrical connector for easy insertion of one or more electrical cables through a hole or knock-out of an electrical box. The electrical connector includes a substantially tubular connector body including sidewalls, a leading end, and a trailing end. A recess in at least one of the sidewalls facilitates orientation of the connector to avoid burrs in the knockout aperture of the electrical box. The connector body includes base flange at the trailing end, an inner bore, and a dividing wall. Two flexible gripper arms are formed at notched areas of the base flange on opposing sides of the sidewalls. An inner tooth and an outer tooth are included on each gripper arm. Each gripper arm includes a top wall and an outward extending wing. The connector enables connection of two cables to a single knockout with the dividing wall preventing contact between the cables.

18 Claims, 6 Drawing Sheets ly to operate, and should be simple to manufacture at a low per unit cost. The electrical connector should project a low profile on the exterior of the box or panel when connected thereto. Furthermore, when connected to a knockout in a steel box, the electrical connector preferably includes a leading end that is capable of being oriented to avoid contact with the burrs that typically remain in the knockout of the steel box.

EASY INSERTION ELECTRICAL CONNECTOR

CROSS-REFERENCE TO RELATED APPLICATIONS

This application claims priority to provisional U.S. Application No. 62/174,591 filed Jun. 12, 2015, the contents of which are incorporated herein by reference in their entirety.

This application is also a Continuation-In-Part of U.S. application Ser. No. 14/996,932 filed Jan. 15, 2016, the contents of which are incorporated herein by reference in their entirety.

FIELD OF THE INVENTION

The present invention relates to the connection of electrical cables to electrical boxes and panels and specifically to an electrical connector for connecting one or more non-metallic electrical cables to an electrical box or panel.

BACKGROUND OF THE INVENTION

Non-metallic cable is commonly used in houses and other structures for supplying electricity to outlets, lights, and numerous other electrical devices. Although many types of connectors have been proposed, many of them are of complex design, are difficult to operate, are expensive to manufacture, and are able to connect only a single cable to an existing knockout aperture. Furthermore, when installed on an electrical box, a substantial portion of conventional electrical connectors project outward of the box, restricting the use of the connector to those boxes that include substantial space around the box. In many situations, there is minimal open area around a box, thus limiting the use of conventional connectors to new work installations or to old work installations where there is ample open space around the box.

Accordingly, what is needed is an electrical connector that enables a user to easily connect one or more non-metallic electrical cables to an electrical box or panel. The electrical connector should be of simple design, easy to operate, and should be simple to manufacture at a low per unit cost. The electrical connector should project a low profile on the exterior of the box or panel when connected thereto. Furthermore, when connected to a knockout in a steel box, the electrical connector preferably includes a leading end that is capable of being oriented to avoid contact with the burrs that typically remain in the knockout of the steel box.

BRIEF SUMMARY OF THE INVENTION

The present invention is an electrical connector for easy insertion of one or more electrical cables through a hole or knock-out of an electrical junction box. The electrical connector includes a substantially tubular connector body including sidewalls, a leading end, and a trailing end. The connector body includes base flange at the trailing end, an inner bore, and a dividing wall dividing the inner bore into separate channels. Two flexible gripper arms are formed at notched areas of the base flange on opposing sides of the sidewalls. An inner tooth and an outer tooth are included on each gripper arm. Each gripper arm includes a top wall and an outward extending wing. The outward extending wing in combination with the base flange form seats on opposing sides of the connector body for accommodating the wall of an electrical box when the connector is pushed into a knockout hole in an electrical box or panel. A recess in the sidewall enables orientation of the connector to avoid burrs in the knockout aperture of the electrical box.

OBJECTS AND ADVANTAGES

A first object of the invention is to provide an electrical connector that can connect one or more non-metallic electrical cables to an electrical outlet box or panel.

A further object of the invention is to provide an electrical connector that is easy to operate and which requires minimum installation time.

A further object of the invention is to provide an electrical connector in which can be used to attach one or two non-metallic cables to a single knock out opening in a box or panel.

A further object of the invention is to provide an electrical connector in which two cables are kept together with a separating wall between the cables.

A further object of the invention is to provide an electrical connector that includes a low profile outside the box when connected thereto, with little of the connector projecting outside the box.

Another object of the present invention is to provide an electrical connector that provides proper strain relief to electrical cables, holding the cables fast within the connector and providing strong resistance to removal of the cables by a pulling force applied to extract them from the connector and box.

A further object of the invention is to provide an electrical connector that may be manufactured at low cost.

A further object of the invention is to provide a means of orienting the connector to avoid burrs in the knockout aperture of the electrical box.

These and other objects and advantages of the present invention will be better understood by reading the following description along with reference to the drawings.

DETAILED DESCRIPTION

Figure 1:
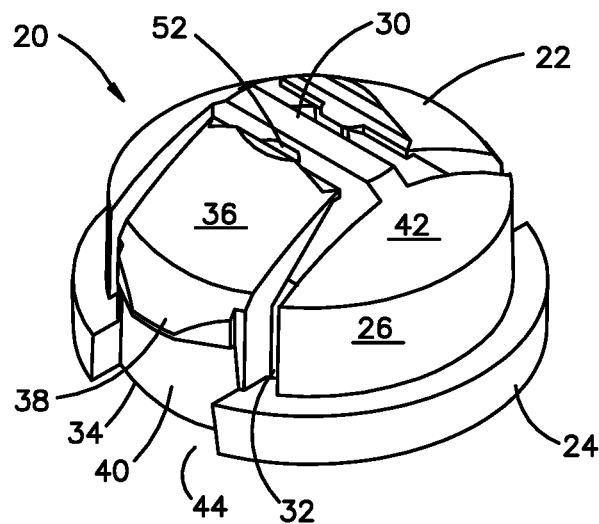
FIG. 1 is a front isometric view of an electrical connector for non-metallic cable according to the present invention.
Figure 2:
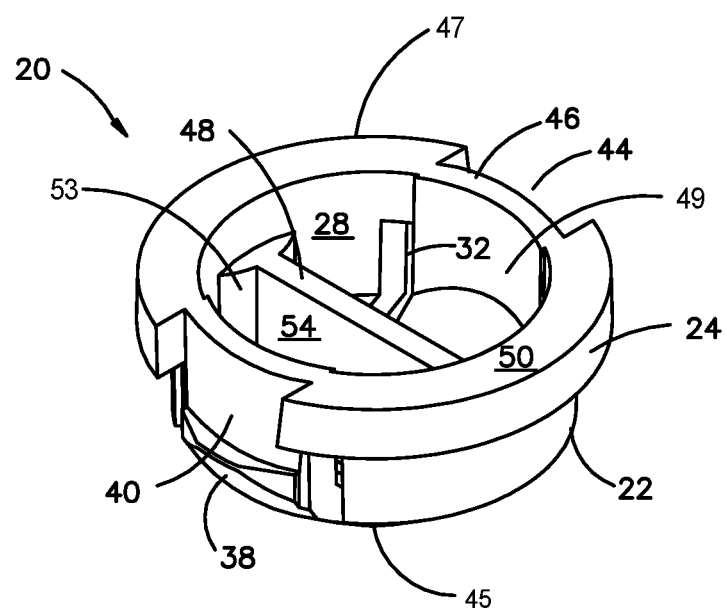
FIG. 2 is a rear isometric view of the electrical connector of FIG. 1.

With reference to FIGS. 1 and 2 there is shown a first embodiment of an electrical connector or fitting for non-metallic cable according to the present invention. The electrical connector 20 includes a connector body 22 with two base flanges 24 and two opposing sidewalls 26. The sidewalls 26 include an inner surface 28 and a dividing wall 30 that is integral with and extends between the inner surfaces. Paired slits 32 on opposing sides 34 of the connector 20 define gripper arms 36 on the connector. The gripper arms 36 include outward extending wings 38 that with the base flange 24 define a seat 40 on the outer surface of the connector 20. The connector body 22 includes a top wall 42 extending between the sidewall 26 and dividing wall 30. Opposing notched areas or notches 44 on the base flange 24 provide a thin wall portion 46 of the connector body 22 extending between the base flanges 24. Dividing wall 30 includes sidewalls 54. As shown in FIG. 1, the gripper arms 36 include a gripper edge 52 adjacent the sidewalls 54 of the dividing wall 30. Gripper arms 36 are thick adjacent the wings 38 and progressively narrow toward the gripper edge 52. A filet 53 extends the length of each end of the dividing wall 30 and outward along the inner surface 28 of the opposing sidewalls 26. The connector 20 includes a leading end 45, a trailing end 47, and an inner bore 49 spanning across the connector at the trailing end 47. As shown in FIG. 2, the dividing wall 30 includes is not flush with the trailing end 47 of the connector body but is offset from the trailing end.

Figure 3:
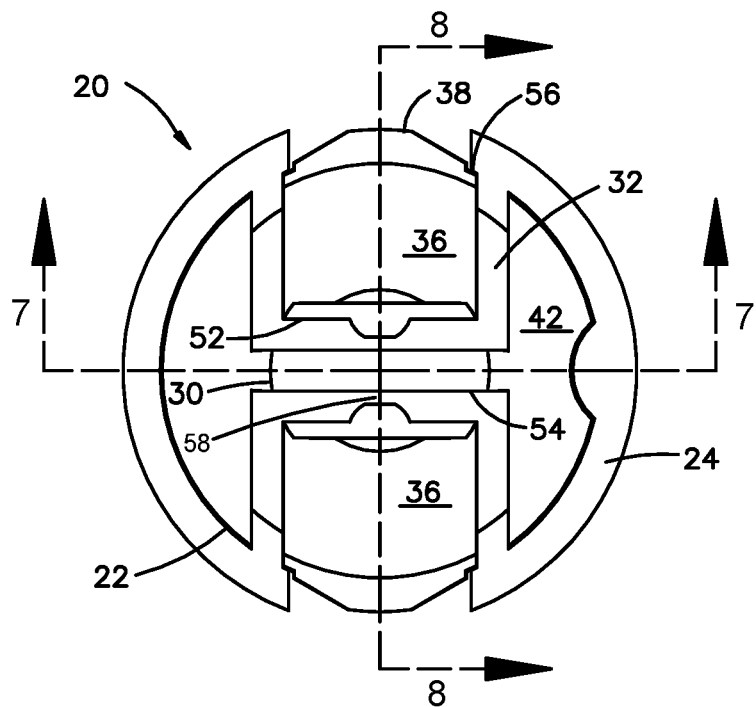
FIG. 3 is front view of the electrical connector.
Figure 4:
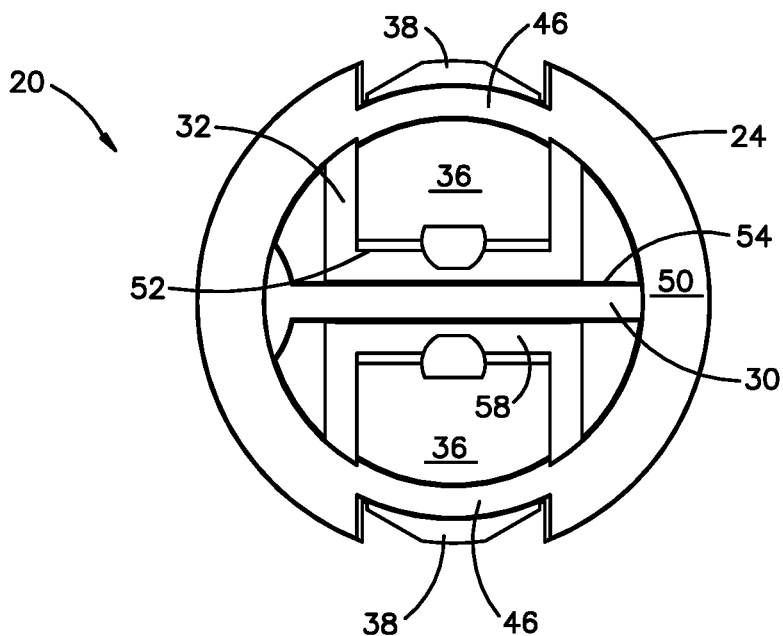
FIG. 4 is a rear view of the electrical connector.

With reference to FIGS. 3 and 4, the gripper arms 36 extend from their outer ends 56 that are integral with the connector body 22 to the gripper edge 52. A narrow gap 58 extends between each gripper edge 52 and the adjacent wall 54 of the dividing wall.

Figure 5:
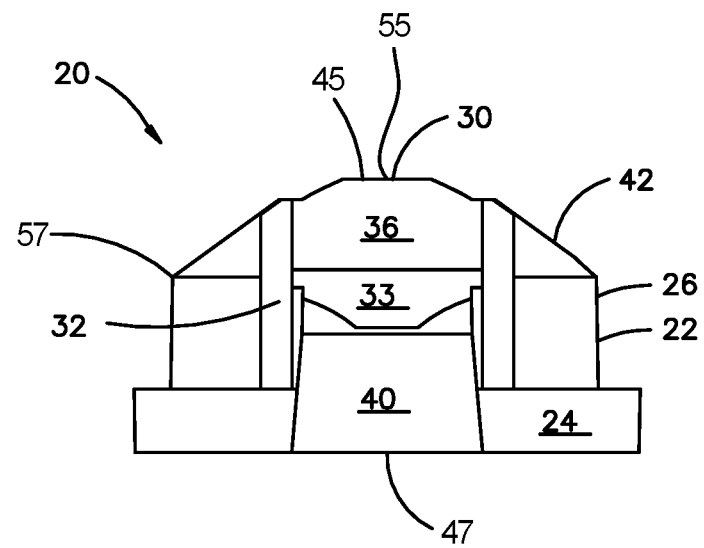
FIG. 5 is a side view of the electrical connector as viewed from the top side of FIG. 3.
Figure 6:
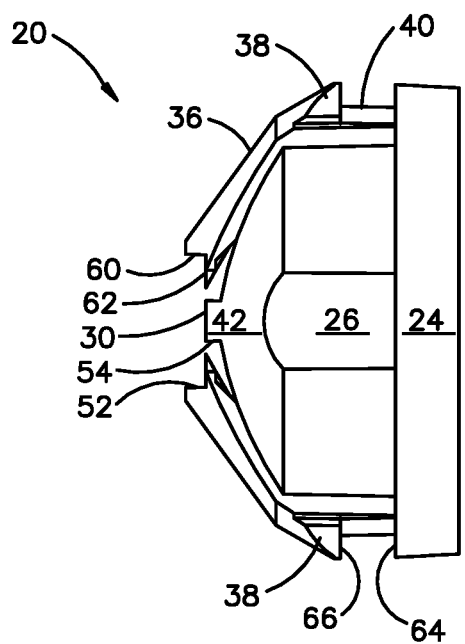
FIG. 6 is a side view of the electrical connector as viewed from the right side of FIG. 3.

Referring to FIGS. 5 and 6, the gripper edge 52 includes a V-shaped notch 60 therein. V-shaped notch 60 includes a sharp inner edge 62 adjacent the wall 54 of the dividing wall 30. Base flanges 24 include a top surface 64 and wings 38 include a bottom surface 66. Top surface 64 of base flanges 24 and bottom surface 66 of wings 38 are preferably flat and parallel to one another. As shown in FIG. 5, top wall 42 of gripper arm 36 slopes downward from the interior portion 55 to the outer periphery 57 of the leading end 45.

Figure 7:
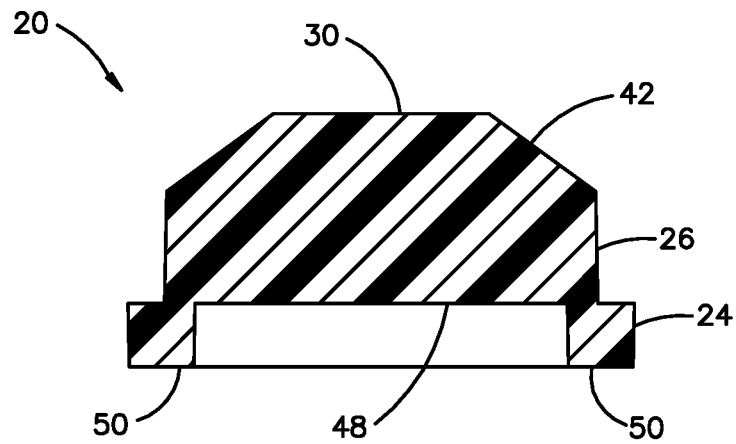
FIG. 7 is a sectional view of the electrical connector taken along line 7-7 of FIG. 3.
Figure 8:
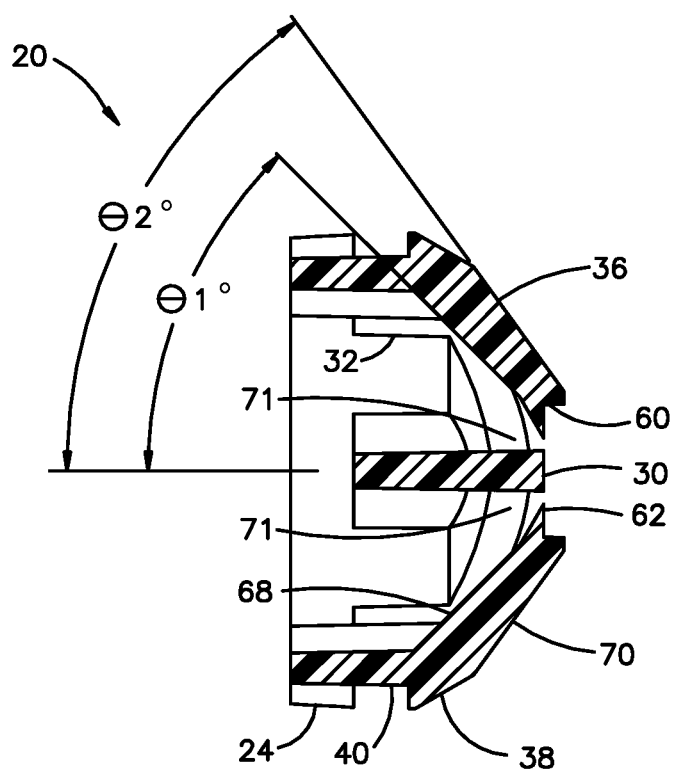
FIG. 8 is a sectional view of the electrical connector taken along line 8-8 of FIG. 3.

With reference to FIGS. 7 and 8, the bottom edge 48 of the dividing wall 30 is offset from the bottom surface 50 of the base flange 24. Gripper arms 36 include an inner surface 68 that is at an angle θ1 with respect to the dividing wall 30 and an outer surface 70 that is at an angle θ2 with respect to the dividing wall 30. Angle θ1 of the inner surface 68 of the gripper arms 36 with respect to the dividing wall 30 is preferably between 43 and 47 degrees. Angle θ2 of the outer surface 70 of the gripper arms 36 with respect to the dividing wall 30 is preferably between 52 and 56 degrees. As shown in FIG. 8, the connector 20 includes two cable channels 71 therein, one formed between each gripper arm 36 and the dividing wall 30. The dual channels 71 are positioned on either side of the dividing wall 30.

Figure 9:
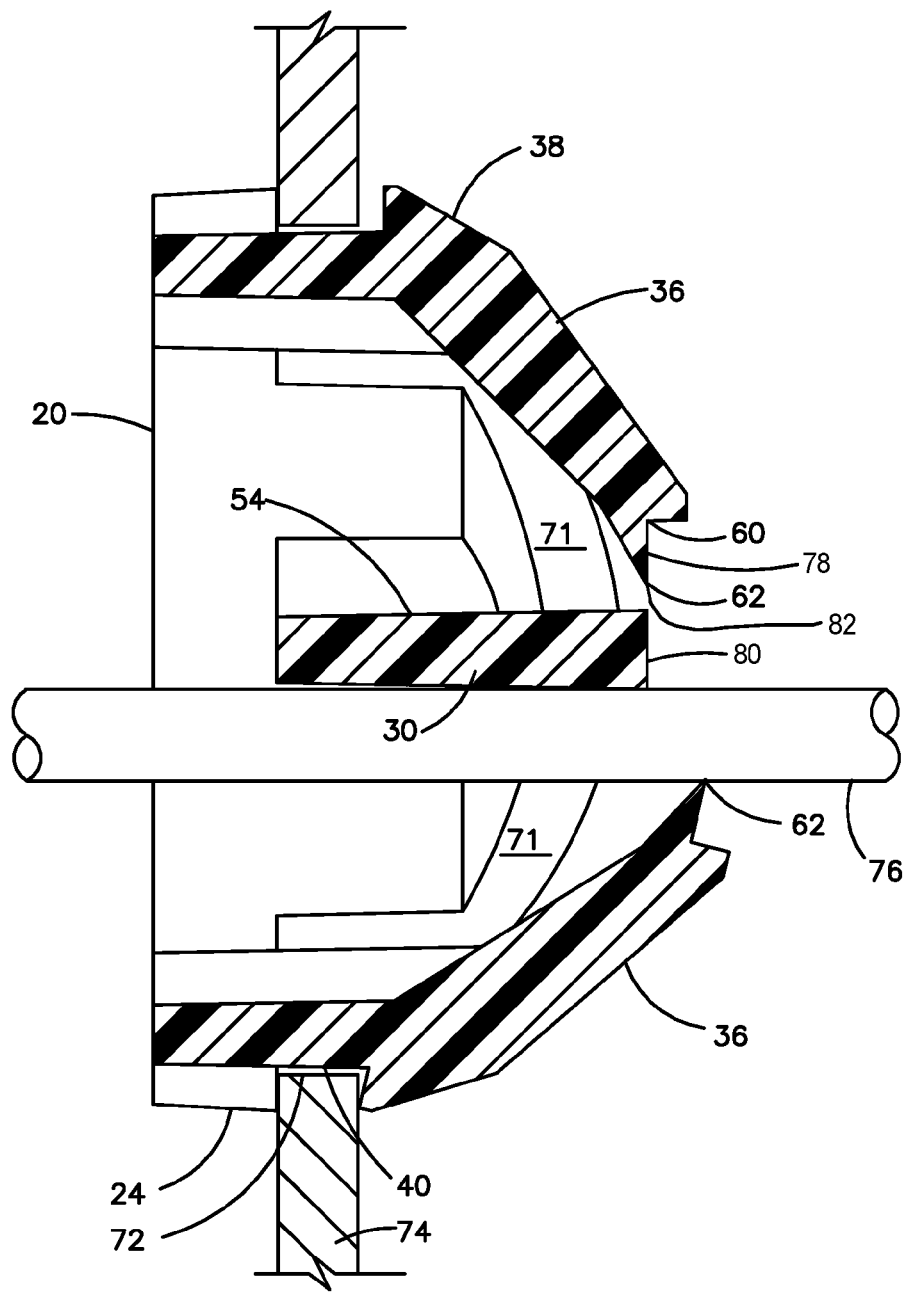
FIG. 9 is a sectional view of the electrical connector depicting an electrical cable inserted there through and being held by the connector.

Referring to FIG. 9, the electrical connector 20 of the present invention enables an electrician to rapidly install a non-metallic cable within the knock out aperture of an electrical box. To operate the invention, the electrical connector 20 is simply pushed into the aperture 72 until electrical box wall 74 is nested in seat 40 between wings 38 and base flange 24. Gripper arms 36 easily flex inward with respect to the connector body 22 as a result of the thin wall portion 46 at the notched areas 44 and the paired slits 32 on the opposing sides 34 being narrower or thinner than the base flanges 24. Thus the electrical connector 20 can be easily snapped into the knockout aperture. One or two electrical cables 76 can then be inserted into the electrical connector 30 between the gripper arm 36 and the adjacent wall 54 of the dividing wall 30. Sharp inner edge 62 of V-shaped notch 60 bites into the flexible sheath of electrical cable 76 and holds the electrical cable securely to the electrical box and provides proper strain relief to resist reverse pullout of the cables and thereby conform to established electrical code. One or two electrical cables may be inserted into the connector 20, one in each channel 71 between gripper arm 36 and wall 54 of dividing wall 30. The sharp inner edge 62 includes a flat leading surface 78 and dividing wall 30 includes a flat leading edge 80. With the gripper arm 36 in an unbiased position, as shown for the gripper arm in the top half of FIG. 9, flat leading surface 78 of gripper arm is parallel with flat leading edge 80 of dividing wall 30. The point 82 of sharp inner edge 62 in the unbiased position is pointed toward the flat leading edge 80 of dividing wall 30.

As shown in FIG. 9, when installed on the electrical box, advantageously very little of the connector 20 projects outward of the electrical box. After connection of the cables, only the base flange 24 portion of the connector 20 remains outside the box, thus reducing the outward profile or extension of the connector and making it easy for the installer to fit the connector within the typically cramped space between the exterior of the electrical box and the surrounding wall structure.

Figure 10:
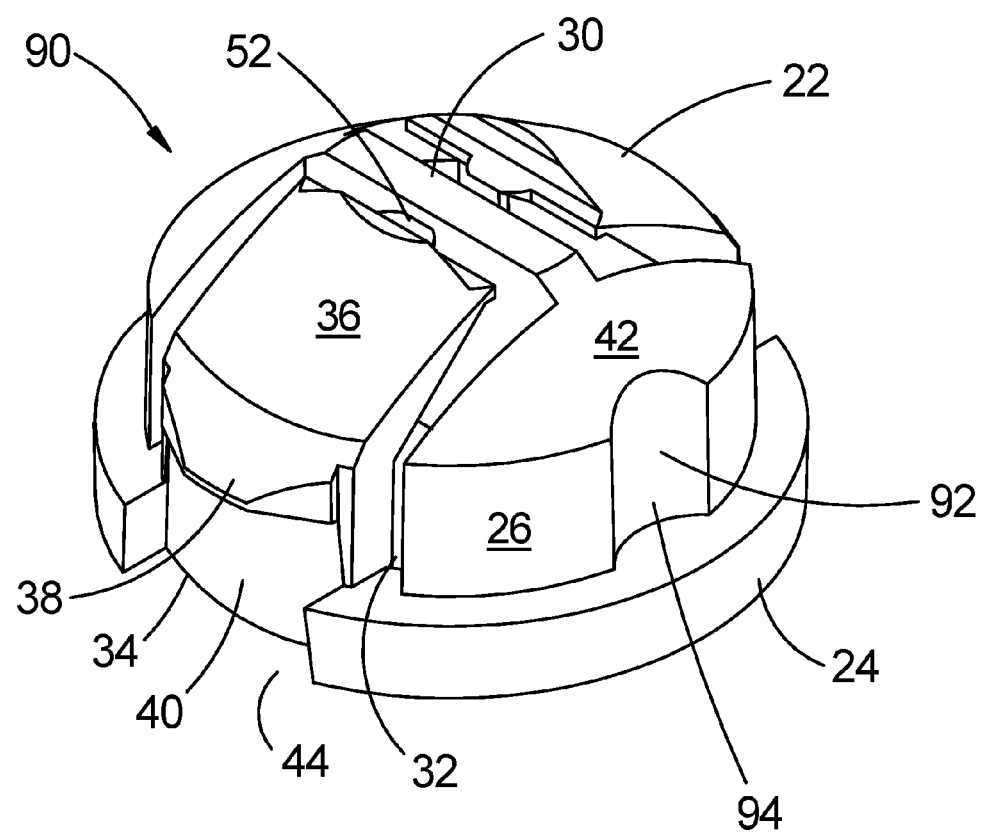
FIG. 10 is a front isometric view of the preferred embodiment of an electrical connector for non-metallic cable according to the present invention.

With reference to FIG. 10 there is shown a second and preferred embodiment of an electrical connector or fitting 90 for non-metallic cable according to the present invention. Similar to the first embodiment described hereinabove, the electrical connector 90 includes a connector body 22 with two base flanges 24 and two opposing sidewalls 26. The preferred embodiment of the electrical connector 90 further includes a recess 92 in at least one of the sidewalls 26. When inserting the connector 90 into a steel box, the recess 92 provides a means of orienting the connector to avoid burrs in the knockout aperture of the steel box. The recess includes an arcuate surface 94 that is directed in an inverse direction of the arcuate surface of the outer circumference of the base flange 24.

The electrical connector of the present invention is preferably constructed of plastic and most preferably is molded in one piece of plastic. Appropriate plastic materials for construction of the connector include polycarbonate and polyvinyl chloride.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given

What is claimed is:
1. An electrical connector, comprising:
   a tubular connector body including sidewalls, a leading end, a trailing end, and an inner bore at said trailing end;
   a base flange on said connector body at said trailing end;
   a dividing wall on said connector body, said dividing wall including sidewalls;
   said dividing wall dividing said inner bore into separate channels at said leading end of said connector body;
   two flexible gripper arms extending from said base flange;
   a gripper edge on each of said gripper arms; and
   a recess in one of said sidewalls of said tubular connector body.

2. The electrical connector of claim 1, further comprising:
a top wall and an outward extending wing on said gripper arms; and
a seat formed by said base flange and said outward extending wing of said gripper arms.

3. The electrical connector of claim 2, wherein said gripper arms are thick adjacent the outward extending wings and progressively narrow toward said gripper edges.

4. The electrical connector of claim 1, further comprising:
paired slits on said connector body; and
said paired slits defining said gripper arms.

5. The electrical connector of claim 1, further comprising:
a top wall on said gripper arms at said leading end of said connector body;
an interior portion and an outer periphery on said leading end of said connector body; and
said top wall of said gripper arms sloping downward from said interior portion to said outer periphery of said connector body.

6. The electrical connector of claim 1, further comprising:
a notched area on said base flange of said connector body; and
a thin wall portion on said connector body at said notched area.

7. The electrical connector of claim 1, wherein said dividing wall is offset from said trailing end of said connector body.

8. The electrical connector of claim 1, further comprising a V-shaped notch on said gripper edges on each of said gripper arms.

9. The electrical connector of claim 8, further comprising a sharp inner edge on said gripper arms, said sharp inner edge adjacent said sidewalls of said dividing wall.

10. The electrical connector of claim 9, further comprising a flat leading surface on said sharp inner edge of said gripper arms.

11. The electrical connector of claim 10, further comprising a flat leading edge on said dividing wall.

12. The electrical connector of claim 11, wherein said flat leading surface of said gripper arms is parallel with said flat leading edge of said dividing wall.

13. The electrical connector of claim 11, further comprising:
a point on said sharp inner edge of said gripper arms; and
said point on said sharp inner edge is pointed toward the flat leading edge of said dividing wall.

14. An electrical connector, comprising:
a tubular connector body including sidewalls, a leading end, a trailing end, and an inner bore at said trailing end;
a base flange on said connector body at said trailing end;
a dividing wall on said connector body, said dividing wall including sidewalls;
said dividing wall dividing said inner bore into separate channels at said leading end of said connector body;
two flexible gripper arms extending from said base flange;
a gripper edge on each of said gripper arms;
an outward extending wing on each of said gripper arms;
a seat formed by said base flange and said outward extending wings of said gripper arms;
a recess in one of said sidewalls.

15. The electrical connector of claim 14, further comprising paired slits on said connector body that define said gripper arms.

16. The electrical connector of claim 14, further comprising:
a top wall on said gripper arms at said leading end of said connector body;
an interior portion and an outer periphery on said leading end of said connector body; and
said top wall sloping downward from said interior portion to said outer periphery.

17. The electrical connector of claim 14, wherein said gripper arms are thick adjacent the outward extending wings and progressively narrow toward said gripper edges.

18. The electrical connector of claim 14, wherein said dividing wall is offset from said trailing end of said connector body.

* * * * *